United States Patent Office 3,100,698
Patented Aug. 13, 1963

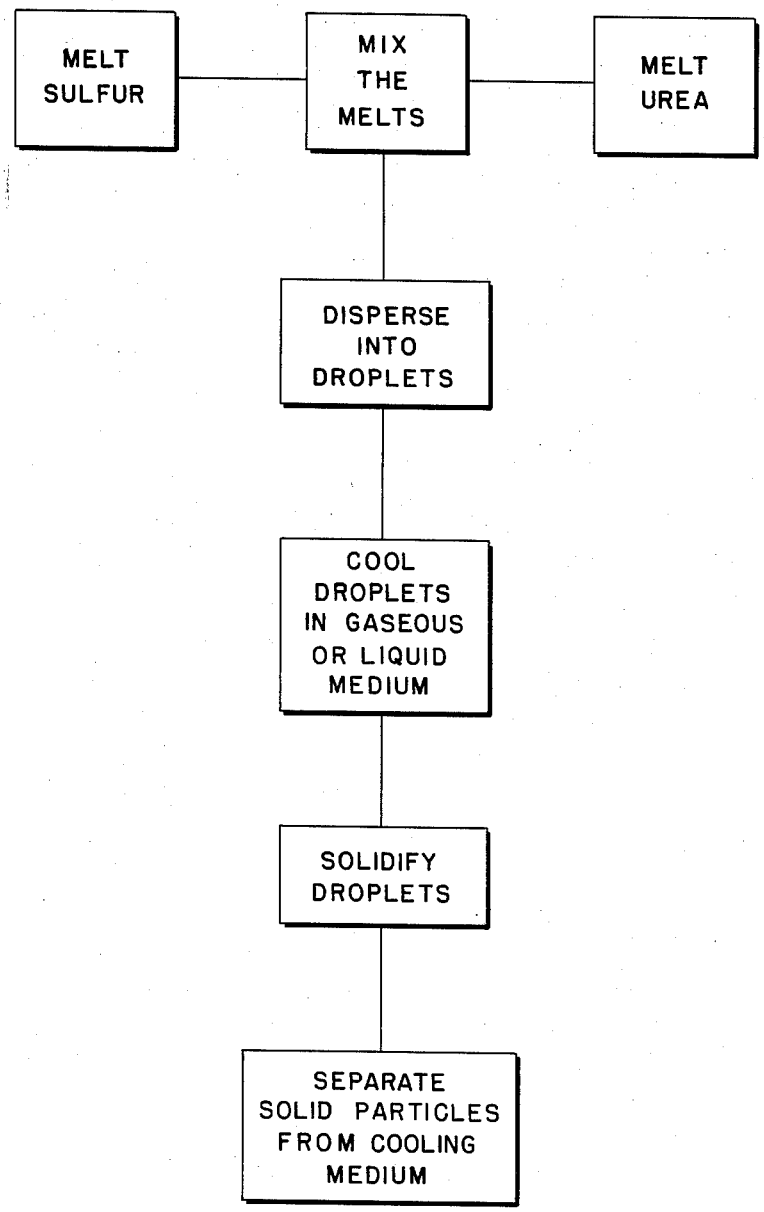

3,100,698
UREA-SULFUR FERTILIZER COMPOSITION AND METHOD FOR ITS PRODUCTION
Franz A. Horsley, Danville, and Paul A. Gray, Jr., Corte Madera, Calif., assignors to Shell Oil Company, New York, N.Y., a corporation of Delaware
Filed Sept. 23, 1960, Ser. No. 58,074
8 Claims. (Cl. 71—28)

This invention relates to a novel fertilizer material and a process for producing the same. Urea has been used in the recent past as a fertilizer and is most useful for adding nitrogen to the soil. It is high in nitrogen content and therefore can be shipped considerable distances economically. The product can be produced in prills which can be readily bagged, however, the contents of the bags tend to stick together due to the moderately hygroscopic nature of the urea. If the urea becomes caked when in bags considerable time and labor is spent in breaking up the urea to render it suitable for distribution in the field by drills or other distribution machinery.

In order to reduce this sticky tendency of the urea, various expedients such as tumbling the urea prills, prior to bagging, with inert dusts, such as diatomaceous earths, have been practiced. These materials are effective but have a disadvantage in that the guaranteed active fertilizer material content is reduced.

Besides nitrogen, many soils, for example those in the western part of the United States, require sulfur as a plant nutrient and soil amendment.

The supplying of sulfur to the soil is commonly done by dusting with elemental sulfur, by the use of ammonium sulfate, by the use of ammonium bisulfite, by the use of gypsum, or by the use of polysulfide solutions distributed into the soil. However, in some cases these methods are not desirable.

It is therefore and object of this invention to provide a new means for simultaneously supplying nitrogen and sulfur to the soil.

A further object is to provide a new product, which has considerable resistance to caking.

A further object is to provide a new product combining at will elemental sulfur and urea in desired proportions.

A still further object is to provide a process for the manufacture of the desired product.

We have found that by making a mixed melt of urea and elemental sulfur that a new and useful fertilizer material results.

According to one operation of the invention, sulfur was melted in a fifty-five gallon drum containing internal steam coils. Molten sulfur at a temperature of 260–290° F. was caused to flow from the drum through a steam-jacketed and steam-traced line to the suction side of a prill tower feed pump under the influence of the 28 inches of mercury vacuum at the pump suction. A globe valve in the sulfur supply line was used to control the amount of the molten sulfur flow. Concentrated urea at a temperature of about 285° F. from the production flow line of a urea synthesis apparatus was simultaneously led to the prill tower feed pump suction. Runs were made using fan spray atomizing nozzles of usual type. The molten sulfur and urea melt were mixed in passing through the pump and prill tower feed piping. Mixed melt temperatures were kept above about 270° F. when operating in the 10–15% sulfur content by weight range. At temperatures above about 310° F. urea decomposition became excessive. The mixed melt was forced through the fan spray nozzles mounted at an angle of about 45° with the horizontal, and situated about 46 ft. above the prill conveyor belts. As a result, the particles had a trajectory equivalent to about 70° feet of vertical fall. Air temperature in the tower was 70° F. at the bottom inlet and 93° F. at the top outlet. A tower draft of 1 ft./sec. was maintained. Several tons of urea-sulfur prills were made, adding sulfur at the rate of 1.4 gallons per minute. The urea-sulfur product was run directly to the bagging hopper and immediately bagged.

In another operation, previously weighted batches of solid urea prills were added to a desired amount of molten sulfur in a steam-jacketed, steel mixing vessel of seven-gallon capacity. The vessel was equipped with a high speed stirrer. The mixture was heated and stirred until the urea melted. The molten mixture was then withdrawn from the mixing vessel through a steam heated line into a steam-jacketed open tray perforated plate prill head. The plate contained 100 holes. Flow to the prill nozzle was controlled by a valve on the line to maintain a desired level in the prill tray. Molten droplets from the prill head were dropped in the prill tower a distance of 118 feet to a conveyer belt at the bottom.

While in the above operation solid urea prills were added to molten sulfur, it is contemplated that a reverse arrangement could be used, namely, measured amounts of elemental sulfur can be added to a desired amount of molten urea in a vessel to produce the desired mixed melt.

While in the above operations the mixed melt was led to a prilling head, it should be understood that we may alternately conduct the molten streams to a heads tank wherein the mixture is continuously stirred. From the heads tank the mixture can flow directly to a perforated plate or spinning disc prilling head.

The use of a stirred heads tank is most desirable when prilling urea-sulfur compositions containing in excess of about 60% sulfur. We have found that with such mixtures that unless a vigorous stirring of the joint melt is maintained almost up to the time of dispersion that phase separation of the two liquid phases takes place with the result that un-uniform prills are formed. In all operations care must be taken to ensure that the temperature of all vessels, pumps and conduits employed for handling the molten urea, molten sulfur and molten urea-sulfur mixture are maintained at sufficiently high temperatures to ensure that solidification of the materials does not take place. Such solidification might entail a shutdown of the operation and difficult and time-consuming cleaning operations. Care must also be taken that the temperature is not raised too high as decomposition of the urea with consequent loss of nitrogen and formation of undesirable by-products will otherwise result.

In general, we have found that for compositions containing more than about 10% urea by weight that the temperature must be maintained above about 270° F. to avoid freezing of the melt.

Various forms of distributors for the molten mixture discharged into the prill tower can be used. For example, a spray nozzle, whirling basket, rotating disc, orifice nozzle or similar devices may be used. In fact, any distributor suitable for urea or ammonium nitrate may be used for urea-sulfur.

Instead of employing a prill tower, the mixed urea-sulfur composition may be made by other means such as by granulating, pherodizing, or flaking, which general techniques are well-established and known.

We have found that the urea and sulfur can be co-prilled in substantially all percentages by weight.

Using the co-prilling process above-described, we have produced urea-sulfur products of different percentage.

EXAMPLE I

In plant operations amounts of urea in concentrated molten form and sulfur in molten form from a supply tank were mixed by passage through the prill tower feed pump and ejected through fan spray nozzles according to the commercial process therein first-described.

The prilled product recovered had the following composition by weight:

| | Percent |
|---|---|
| Total nitrogen, Kjeldahl | 40.0 |
| Biuret | 1.26 |
| Water | 0.6 |
| Sulfur | 13.5 |

EXAMPLE II

In another run the product had the following analysis:

| | Percent |
|---|---|
| Total nitrogen, Kjeldahl | 41.19 |
| Biuret | 1.41 |
| Water | 0.67 |
| Sulfur | 10.74 |

Screen analyses of the above two products averaged as follows:

| Tyler mesh | +8 | 8–10 | 10–12 | 12–14 | 14–20 | 20–28 | −28 |
|---|---|---|---|---|---|---|---|
| Weight percent | 4.3 | 30.9 | 29.2 | 19.8 | 14.0 | 1.3 | 0.5 |

Approximate bulk density was 50 lbs. per cubic ft.

EXAMPLE III

In another operation sufficient urea was added to a jacketed vessel containing molten sulfur to produce a mixed melt: 50% sulfur–50% urea by weight. Thereafter, the melt was conducted to a prill head, the temperature being maintained at 275° F. The molten melt was discharged from the prill nozzle into a prill tower in which the air temperature was 72° F. The prills of sulfur-urea were collected by means of a conveyer belt in the bottom of the tower after 118 feet of free fall. The collected prills had the following composition:

| | |
|---|---|
| Total nitrogen, Kjeldahl | 23.9% by weight. |
| Biuret | 2.2% by weight. |
| Water | 1.78% by weight. |
| Sulfur | 44.8 by difference. |

A screen analysis of the product gave the following results:

| Tyler mesh | +6 | 6–8 | 8–10 | 10–12 | 12–14 | 14–20 | 20–28 | −28 |
|---|---|---|---|---|---|---|---|---|
| Weight percent | 33.3 | 19.0 | 29.9 | 5.6 | 2.9 | 2.9 | 2.6 | 3.7 |

EXAMPLE IV

Sulfur-urea mixtures of different percentage compositions were prepared by adding the required volumes of molten sulfur and molten urea from a production melt line to a stainless steel vessel having a stirrer. The mixed product from the vessel was passed to a priller head. The molten mixture droplets fell through the prill tower to a conveyer belt where the solidified product was continuously removed from the tower.

The following is a tabulation of these runs:

| Mix, percent sulfur | Temp. in nozzle ° F. | Tower temp. air, ° F. | | Tower draft, ft./sec. | |
|---|---|---|---|---|---|
| | | In | Out | Top | Bottom |
| 5 | 297 | 72 | 92 | 3.4 | 1.7 |
| 20 | 305 | 72 | 94 | 3.4 | 1.7 |
| 30 | 295 | 76 | 96 | 3.4 | 1.7 |
| 50 | 285 | 72 | 94 | 3.4 | 1.7 |
| 80 | 305 | 77 | 96 | 3.4 | 1.6 |

In prilling the sulfur-urea mix it has been found that the higher the percentage of sulfur the more severe the cooling conditions must be. The additional cooling may be supplied in various ways such as by lengthening the fall of the molten droplets in the prill tower; reducing the temperature of the air in the prill tower by refrigeration, or by other means. Various other techniques can be used to assist the cooling such as quenching the semi-solidified prills in a bath of oil or other liquid in which the prills are not soluble.

The urea-sulfur compositions as produced were tested with laboratory caking test equipment. The conclusions drawn from the test were that although urea-sulfur product as made will cake slightly, drying to a residual moisture content of 0.2–0.3% water appreciably reduces the severity of the caking. Uncoated urea-sulfur product does not cake as severely as uncoated urea.

Using a sulfur-urea product having 40% by weight nitrogen and 13.5% by weight sulfur, the following results have been obtained in experimental plots of Ripperdan soils:

Yellow Crookneck Squash

| Material | Rate of N per acre | Production in pounds per acre | Difference |
|---|---|---|---|
| Urea | 100 | 11,520.0 | 750.0 |
| Urea-sulfur | 100 | 12,840.0 | 2,070.0 |
| Ammonium-sulfate | 100 | 12,100.0 | 1,330.0 |
| Check | 0 | 10,770.0 | |

In another comparative test using sulfur-urea product of the same sulfur and urea content, the results were as follows:

Sweet Corn

| Material | Rate of N per acre | Production in pounds per acre | Difference |
|---|---|---|---|
| Urea-sulfur | 100 | 15,100 | 5,300 |
| Ammonium-sulfate | 100 | 14,700 | 3,900 |
| Check | 100 | 10,800 | |

It will thus be seen that a fertilizer composition has been formed which has considerable advantages. There has been produced a fertilizer high in nitrogen and containing sulfur predominantly in elemental form. This material readily supplies the sulfur in a desirable form for convenient application to soils.

Another considerable advantage of this fertilizer composition is that sulfur is added to the soil in a non-leachable form. As a result, sulfur requirements are only gradually released.

As above stated, the urea and sulfur production can be made in substantially all proportions by weight. In general, however, the soil needs a larger proportion of nitrogen than of sulfur. For example, a minimum application usually of 4 to 5 lbs. of sulfur per acre for low sulfur requirement crops is needed. Grass seed crops require about 5 to 10 lbs. per acre, and such crops as small grains, beans and corn, need 15 to 30 lbs. of sulfur per acre. Normal crop requirements of nitrogen usually run from about 80 to 160 lbs. per acre.

The ratio of urea to sulfur in the fertilizer composition of the invention can be adjusted to meet the various requirements of different crops and different soils. A ratio of from about 1 to 1 urea to elemental sulfur to about 20 to 1 urea to sulfur by weight would be adequate to cover most crop and soil requirements, or otherwise expressed, from 50%–95% urea with the balance predominantly elemental sulfur.

The drawing shows the general steps involved in carrying out the process described herein.

We claim as our invention:

1. A fertilizer composition consisting essentially of co-melted and prilled urea and elemental sulfur.

2. A fertilizer composition consisting essentially of a major part of urea and a minor part of elemental sulfur said urea and said sulfur being co-melted and prilled.

3. A fertilizer composition consisting essentially of co-melted, prilled urea and sulfur, said composition containing 50–95% urea and the remainder elemental sulfur.

4. A fertilizer composition consisting essentially of co-melted, prilled urea and sulfur, said composition containing by weight 40% fixed nitrogen and 13.5% elemental sulfur.

5. Process for the manufacture of a fertilizer composition comprising separately melting urea and elemental sulfur, mixing the melted urea with the melted sulfur, and solidifying the resulting product into discrete particles.

6. Process for the manufacture of a fertilizer composition comprising maintaining a bath of molten sulfur, introducing urea in solid form into said bath, mixing the sulfur and urea while maintaining the temperature of the bath substantially constant so that a mixed melt of sulfur and urea is formed and dispersing said melt in droplets in a cooling medium to form solid urea-sulfur particles.

7. Process for the manufacture of a fertilizer composition comprising maintaining a bath of molten urea, introducing sulfur in solid form into said bath, mixing the sulfur and urea while maintaining the temperature of the bath substantially constant so that a mixed melt of sulfur and urea is formed, and dispersing said melt in droplets in a cooling medium to form solid urea-sulfur particles.

8. Process for the manufacture of a fertilizer composition comprising maintaining a stream of sulfur in molten form, maintaining a stream of urea in molten form, blending said streams one with the other in required proportions, maintaining said mixed stream in a molten state and at such temperature that decomposition is substantially prevented, dispersing said melt in droplets, and thereafter cooling said droplets to form solid urea-sulfur particles.

References Cited in the file of this patent
UNITED STATES PATENTS

| | | |
|---|---|---|
| 1,044,452 | Holland | Nov. 12, 1912 |
| 1,883,718 | Grether | Oct. 18, 1932 |
| 1,977,628 | Hall | Oct. 23, 1934 |
| 2,036,870 | Harvey | Apr. 7, 1936 |
| 2,231,423 | Horsley | Feb. 11, 1941 |
| 2,766,107 | White | Oct. 9, 1956 |
| 2,912,316 | Skinner | Nov. 10, 1959 |

FOREIGN PATENTS

| | | |
|---|---|---|
| 805,775 | Great Britain | Dec. 10, 1958 |

OTHER REFERENCES

Hanna, L.: "Hanna's Handbook of Agricultural Chemicals," publ. by Lester A. Hanna, Rte. 1, Box 210, Forrest Grove, Oregon, 2nd Edition, 1958, pages 107–112 and 123–125.